US012508698B2

(12) United States Patent
Wu

(10) Patent No.: US 12,508,698 B2
(45) **Date of Patent: *Dec. 30, 2025**

(54) TORQUE TOOL USING COLORS FOR IDENTIFICATION

(71) Applicant: MATATAKITOYO TOOL CO., LTD., Taichung (TW)

(72) Inventor: Yi-Min Wu, Taichung (TW)

( * ) Notice: Subject to any disclaimer, the term of this patent is extended or adjusted under 35 U.S.C. 154(b) by 373 days.

This patent is subject to a terminal disclaimer.

(21) Appl. No.: 18/098,702

(22) Filed: Jan. 19, 2023

(65) Prior Publication Data

US 2023/0150100 A1 May 18, 2023

Related U.S. Application Data

(63) Continuation-in-part of application No. 17/315,359, filed on May 10, 2021, now Pat. No. 11,958,172, and a continuation-in-part of application No. 17/315,358, filed on May 10, 2021, now Pat. No. 11,612,988.

(51) Int. Cl.
*B25B 23/142* (2006.01)
*B25B 23/16* (2006.01)

(52) U.S. Cl.
CPC .......... *B25B 23/1427* (2013.01); *B25B 23/16* (2013.01)

(58) Field of Classification Search
CPC ... B25B 23/14; B25B 23/142; B25B 23/1422; B25B 23/1427; B25B 23/0007; B25B 23/0035; G01L 5/24; G01L 5/243; G01L 1/00; G01L 5/00; G01L 3/00
See application file for complete search history.

(56) References Cited

U.S. PATENT DOCUMENTS

| | | | | |
|---|---|---|---|---|
| 4,982,627 A | | 1/1991 | Johnson | |
| 5,473,519 A | * | 12/1995 | McCallops | B25F 5/021 362/120 |
| 7,222,559 B2 | * | 5/2007 | Wang | B25B 23/1427 81/475 |
| 7,836,781 B1 | * | 11/2010 | Chen | B25B 23/1427 73/862.22 |
| 11,173,582 B2 | * | 11/2021 | Ruetschi | B25B 13/463 |
| 11,958,172 B2 | * | 4/2024 | Wu | B25B 23/0035 |
| 12,220,792 B2 | * | 2/2025 | Corsi | B25B 23/1425 |
| 2003/0105599 A1 | * | 6/2003 | Fisher | B25B 23/14 702/41 |
| 2009/0120247 A1 | * | 5/2009 | Hsieh | B25B 23/1425 81/177.1 |
| 2011/0036214 A1 | * | 2/2011 | Potterfield | B25B 13/48 206/374 |
| 2020/0400525 A1 | * | 12/2020 | King | B25B 13/463 |
| 2021/0402576 A1 | * | 12/2021 | Wu | B25B 23/141 |
| 2022/0388133 A1 | * | 12/2022 | Corsi | B25B 23/1425 |

FOREIGN PATENT DOCUMENTS

| | | | | |
|---|---|---|---|---|
| CN | 2118617 U | * | 10/1992 | B25B 13/14 |

* cited by examiner

*Primary Examiner* — David B. Thomas
(74) *Attorney, Agent, or Firm* — Bruce Stone LLP; Joseph A. Bruce

(57) ABSTRACT

A torque tool includes a handle, a pointer and a color ring. The handle is operable to set limits of torque. The pointer is formed on the handle. The color ring includes colored areas corresponding to the limits of torque. The color ring is rotatable around the handle to align one of the colored areas with the pointer to indicate that the handle is ready to transfer torque no larger than a corresponding one of the limits of torque.

4 Claims, 15 Drawing Sheets

TORQUE TOOL USING COLORS FOR IDENTIFICATION

CROSS-REFERENCE TO RELATED APPLICATIONS

This application is a Continuation-in Part (CIP) of U.S. Utility application Ser. No. 17/315,359, entitled "TORQUE TOOL USING COLORS FOR IDENTIFICATION", filed on May 10, 2021, and is a Continuation-in Part (CIP) of U.S. Utility application Ser. No. 17/315,358, entitled "ADJUSTABLE WRENCH USING COLORS FOR IDENTIFICATION", filed on May 10, 2021, which are incorporated by reference herein in their entirety.

BACKGROUND OF INVENTION

Field of Invention

The present invention relates to torque tools and, more particularly, to a torque using colors for identification.

Related Prior Art

There are various tools such as box-ended wrenches, open-ended wrenches, adjustable wrenches, Allen keys, socket wrenches and related components. Pressing or printing is often used to provide a tool with an inscription to show a trademark, an aesthetic pattern or the size of the tool.

The use of the above-mentioned processes to make the inscription is not without any problem particularly where the inscription is used to show the size of the tool. For example, a user may have to wipe grease from the tool to read the inscription to know the size of the tool for the inscription is often covered entirely or partially by grease. Moreover, the user may have to flip the tool over to read the inscription since the inscription is often supported on a lower face of the tool in an operative position.

U.S. Pat. No. 4,982,627 discloses a tool-identifying system in which a color chart shows a range of ten colors and each color indicates a particular numeral. A sequence of indicated numerals represents the value of the size of a tool, in fractional inch or metric size. However, a user has to memorize the correspondence of the colors to the numerals. The user will experience troubles in picking bits of the right sizes might if he or she forgets the correspondence. Accordingly, the user may bring bits of wrong sizes to a working site and fail a task. Alternatively, the user may be forced to bring bits of all sizes to the working site, and this is quite a burden. In operation, the user may pick bits of wrong sizes before getting the bit of the right size, and this is a waste of time.

CN 2118617 discloses an adjustable wrench including a handle, a jaw formed on the handle, another jaw movably connected to the handle, a scale in fractional inch, and another scale in metric size. Each scale provides the correspondence of the value of each size to an actual with of a gap between the jaws. However, the scales could be covered with grease or steins.

Moreover, no wrench has been provided with anything to let a user know an adequate value of torque to be imposed on a workpiece such as a nut and a threaded bolt without causing damages to the workpiece. Hence, the user might not exert an inadequate value of torque to engage a nut with a threaded bolt so that the nut could easily be disengaged from the threaded bolt because of vibration.

The present invention is therefore intended to obviate or at least alleviate the problems encountered in the prior art.

SUMMARY OF INVENTION

It is the primary objective of the present invention to provide a torque tool using colors for identification.

To achieve the foregoing objective, the torque tool includes a handle, a pointer and a color ring. The handle is operable to set limits of torque. The pointer is formed on the handle. The color ring includes colored areas corresponding to the limits of torque. The color ring is rotatable around the handle to align one of the colored areas with the pointer to indicate that the handle is ready to transfer torque no larger than a corresponding one of the limits of torque.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
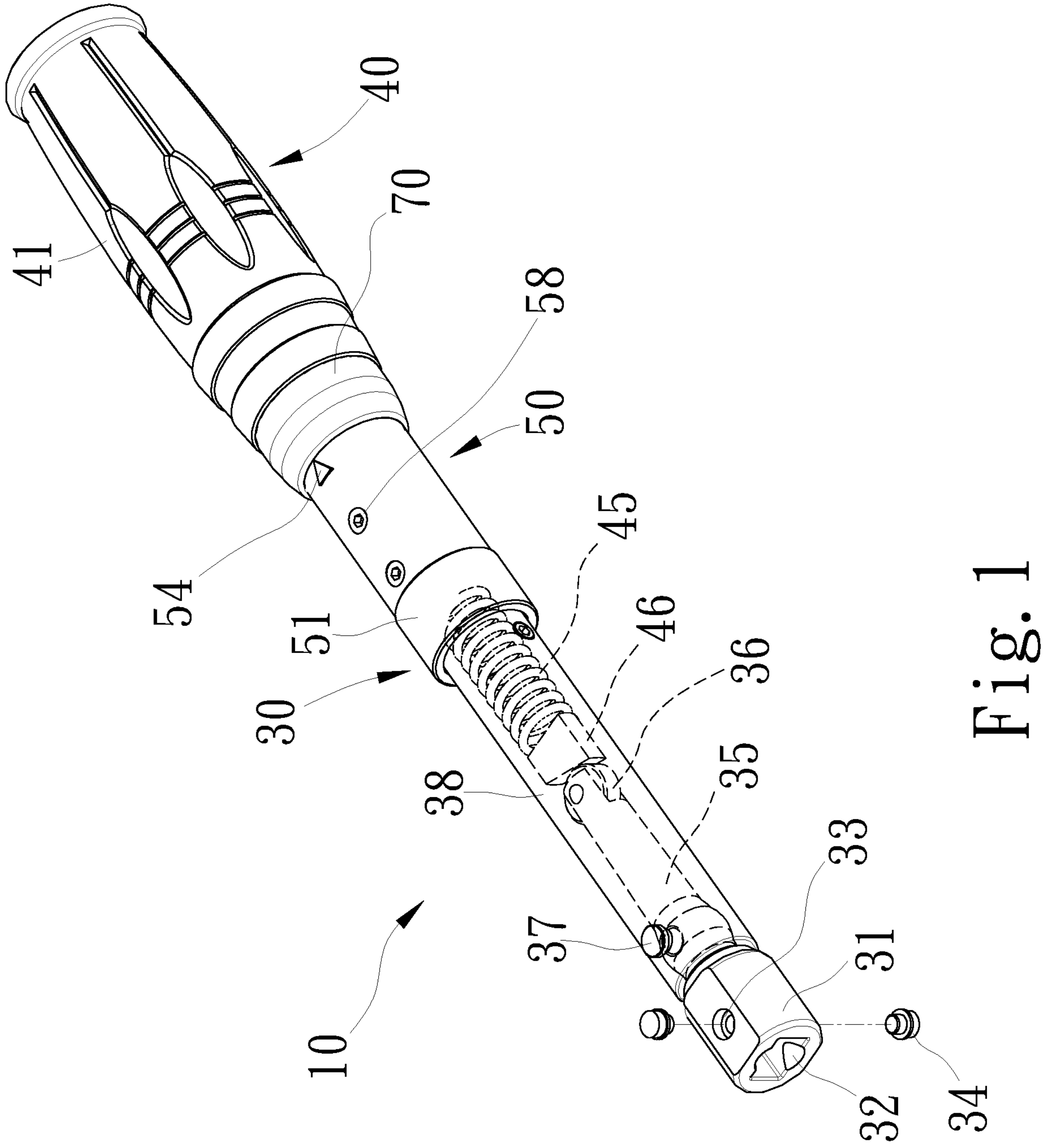
FIG. 1 is a perspective view of a handle of a torque tool according to the preferred embodiment of the present invention.

Referring to FIG. 1, a wrench 10 includes a handle 30 operable to rotate a bit 11 that can be in various sizes as shown in FIGS. 8 through 14. The handle 30 includes a rod 35 inserted in a pipe 38 according to the preferred embodiment of the present invention. The rod 35 is pivotally connected to the pipe 38 by a pivot 37. A wheel 36 is connected to a rear end of the rod 35, which is inserted in the pipe 38. A joint 31 is formed in one piece with a front end of the rod 35, which is located out of the pipe 38. Thus, the joint 31 is located out of the pipe 38. The joint 31 includes a bore 32 in a front end. Two apertures 33 are respectively made in two opposite sides of the joint 31 so that the apertures 33 are in communication with the bore 32. A button 34 is inserted in each of the apertures 33. The buttons 34 are kept on the joint 31 and away from the bore 32.

The handle 30 further includes a torque-adjusting mechanism 40 including a grip 41, a threaded rod 43, a threaded sleeve 44, a spring 45, a wedge 46, a bearing 47, a connector 48 and a controller 49. The spring 45 is inserted in the pipe 38. The wedge 46 is connected to a front end of the spring 45. Thus, the spring 45 abuts the wedge 46 against the wheel 36, which is connected to the rod 35.

Figure 2:
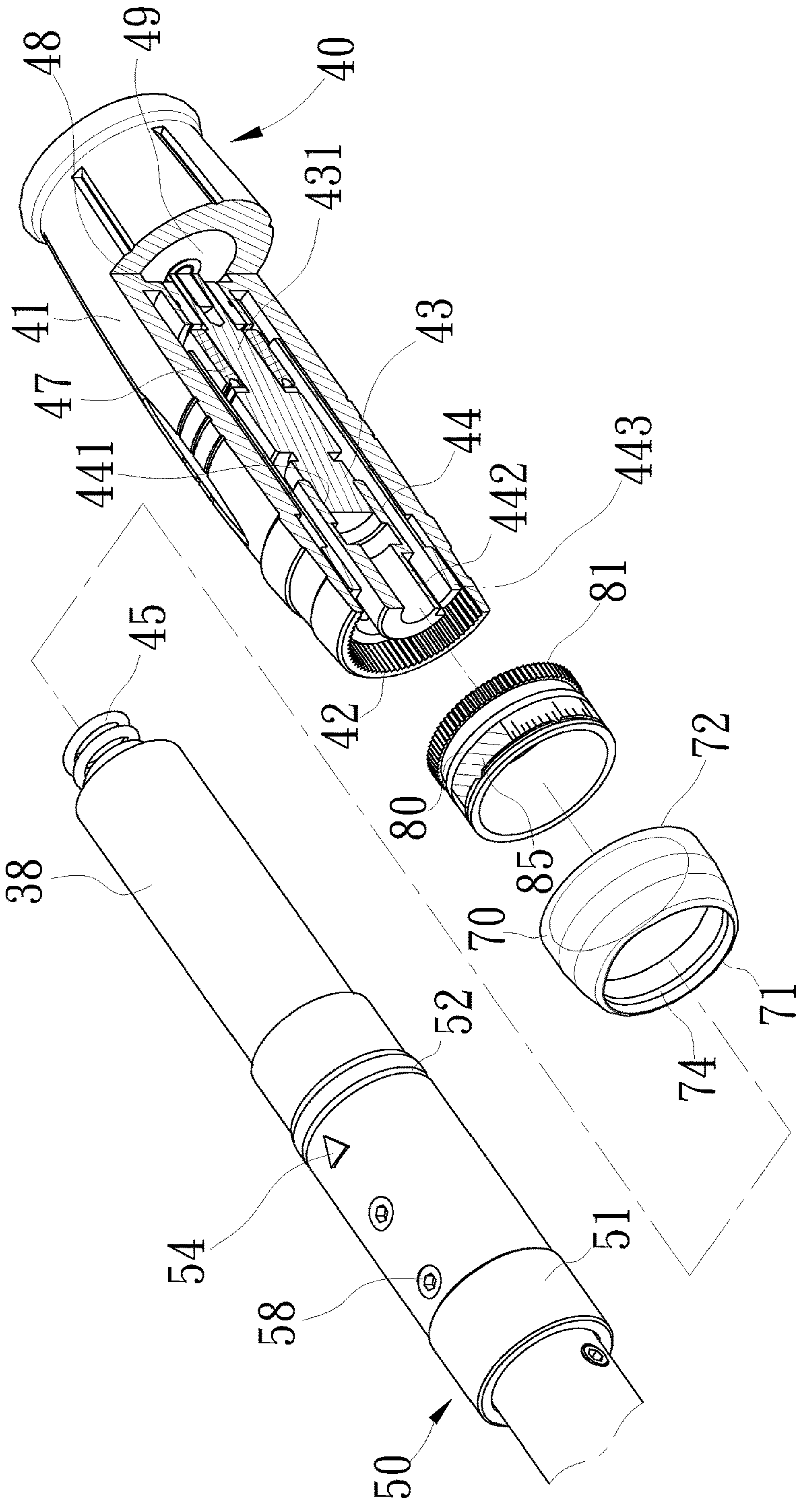
FIG. 2 is an enlarged, partial and exploded view of the handle shown in FIG. 1.
Figure 3:
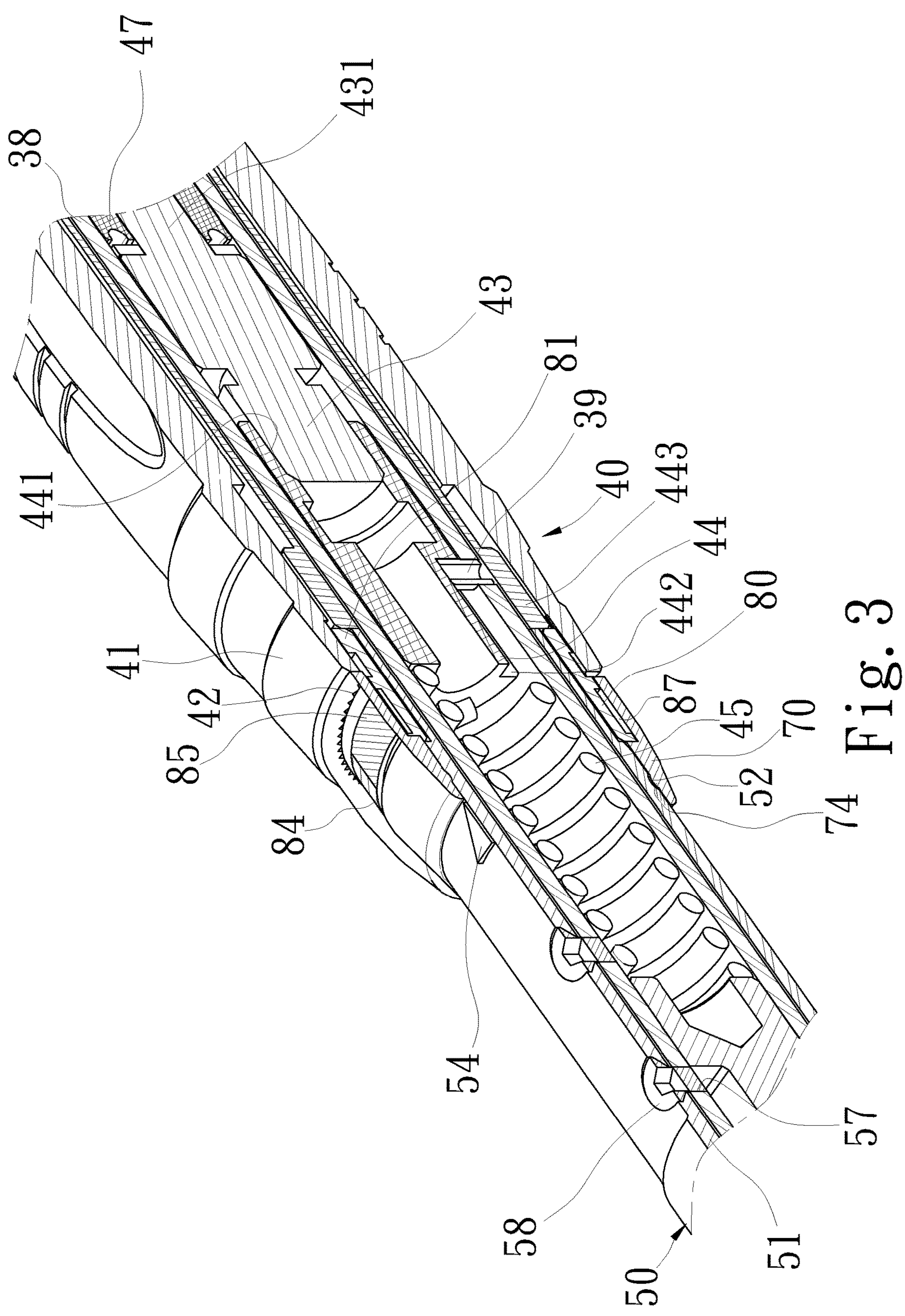
FIG. 3 is an enlarged, partial and cut-away view of the handle shown in FIG. 1.

Referring to FIGS. 2 and 3, the grip 41 extends around a rear section of the pipe 38 so that the former is allowed to rotate around the latter. The rear section of the pipe 38 receives the threaded rod 43 and the threaded sleeve 44. The threaded rod 43 includes a shank 431 supported by the bearing 47, which is fitted in the rear section of the pipe 38. The threaded sleeve 44 includes a thread 441 formed on an internal face and a groove 442 longitudinally made in an external face. The thread 441 of the threaded sleeve 44 is engaged with a thread (not numbered) of the threaded rod 43. A front end of the threaded sleeve 44 is abutted against a spring 45 that is inserted in rear section of the pipe 38. A pin 39 is inserted in the groove 442 via the pipe 38 to prevent the threaded sleeve 44 from rotation in the pipe 38 but allow the threaded sleeve 44 to translate in the pipe 38. The pin 39 is used to abut against a closed end of the groove 442 to set an end for the translation of the threaded sleeve 44 in the pipe 38. A positioning collar 443 is inserted in the grip 41. Moreover, the positioning collar 443 is fitted on the rear section of the pipe 38 so that they are not movable relative to each other. Furthermore, the positioning collar 443 keeps the pin 39 in the pipe 38.

The connector 48 is an annular element that is fitted between the grip 41 and on the shank 431 so that the grip 41 is rotatable with the threaded rod 43. The shank 431 is inserted in the controller 49, which is an annular element. The controller 49 is allowed to translate in the grip 41 in a longitudinal direction of the handle 30 between a locking position and an unlocking position. In the locking position, the controller 49 prevents the grip 41 from rotation around the pipe 38. In the unlocking position, the controller 49 allows the grip 41 to rotate around the pipe 38. Details of the structure of the controller 49 and its relation to the other elements are not the spirit of the present invention and hence will not be given here. However, details of the structure of the controller 49 and its relation to the other elements can be found in U.S. Pat. No. 7,836,781.

The handle 30 further includes an indicating unit 50 including an indicating ring 51, a lens 70 and a color ring 80. The indicating ring 51 includes a pointer 54 on an external face. A middle section of the pipe 38 is inserted in the indicating ring 51. Two screw holes (not numbered) are made in the middle section of the pipe 38. The indicating ring 51 includes two apertures 57. Two screws 58 are respectively inserted in the screw holes of the pipe 38 via the apertures 57, thereby keeping the middle section of the pipe 38 in the indicting ring 51.

A section of the indicating ring 51 is inserted in the color ring 80 so that the color ring 80 is located between the pointer 54 and the positioning collar 443 in the longitudinal direction of the handle 30. The color ring 80 is allowed to rotate on the indicating ring 51, but not translate on the indicating ring 51. The color ring 80 is formed with teeth 81 on an external face. The teeth 81 are engaged with teeth 42 formed on an internal face of the grip 41 so that the color ring 80 is rotatable with the grip 41.

Referring to FIGS. 4 to 7, four colored areas 82, 83, 84 and 85 are located in a recess 87 made in an external face of the color ring 80.

The lens 70 is an annular element formed with two open ends 71 and 72. The lens 70 extends around the indicating ring 51. The lens 70 includes an internal flange 74 inserted in a groove 52 made in the external face of the indicating ring 51, thereby keeping the lens 70 in position on the indicating ring 51 in the longitudinal direction of the handle 30. At the open end 71, the lens 70 is formed with a notch (not numbered) to receive the pointer 54 to prevent the lens 70 from rotation on the indicating ring 51. The lens 70 extends around and hence protectively covers the color ring 80. The open end 72 of the lens 70 is pointed at the grip 41.

Referring to FIGS. 1 through 4, the grip 41 is rotated relative to the pipe 38 in a sense of direction so that the threaded rod 43 translates the threaded sleeve 44 toward the bearing 47, thereby reducing the load in the spring 45. For the engagement of the teeth 81 with the teeth 42, the color ring 80 is rotated around the indicating ring 51 to show a limit of torque that can be transferred by the handle 30.

The pointer 54 is pointed at the colored area 85 of the color ring 80 for example. Hence, the limit of torque that can be transferred by the handle 30 is 65 Nm. In practice, there are inevitably errors in the making of the torque-adjusting mechanism 40 so that the limit of torque that can be transferred by the handle 30 is 65±5 Nm when 65 Nm is shown.

The limit of torque that can be transferred by the handle 30 is determined by the load in the spring 45. The wheel 36 moves beyond the wedge 46, which is connected to the spring 45 to provide a sound when the value of torque transferred by the handle 30 reaches the limit, e.g., 65 Nm. Hence, a user knows that the value of torque transferred by the handle 30 reaches the limit.

Figure 5:
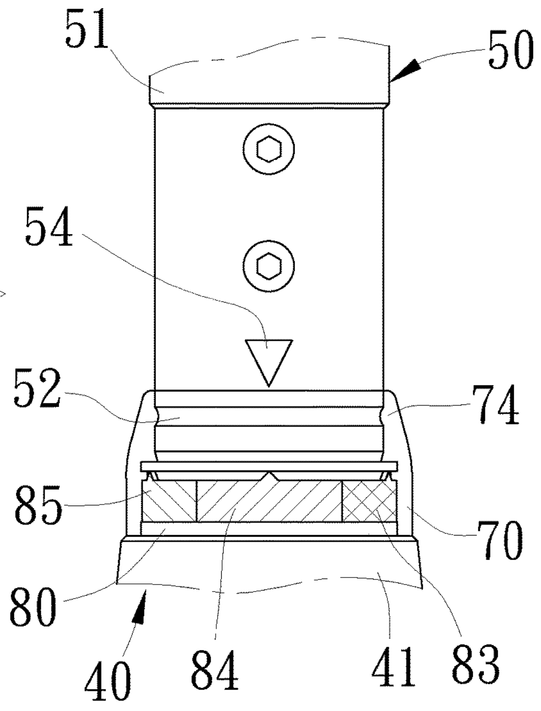

Referring to FIGS. 2, 3 and 5, the grip 41 rotates the threaded rod 43 to translate the threaded sleeve 44 backward to reduce the load in the spring 45. Due to the engagement of the teeth 81 with teeth 42, the color ring 80 is rotated with the indicating ring 51 to immediately represent the limit of torque that can be transferred by the handle 30.

When the pointer 54 is pointed at the colored area 84, it is easily observed that the limit of torque that can be transferred by the handle 30 is 55±5 Nm.

Figure 6:
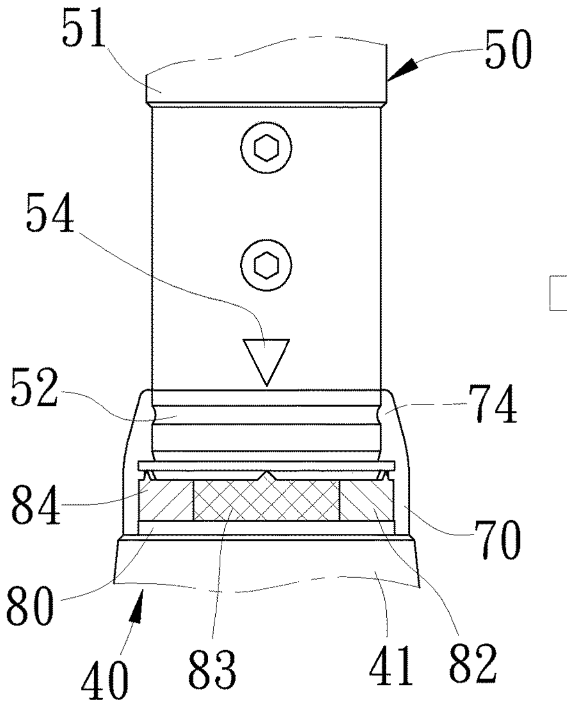

Referring to FIGS. 2, 3 and 6, the above-described process is repeated to change the limit of torque that can be transferred by the handle 30. The pointer 54 is pointed at the colored area 83. It is easily observed that the limit of torque that can be transferred by the handle 30 is 42±5 Nm.

Figure 7:
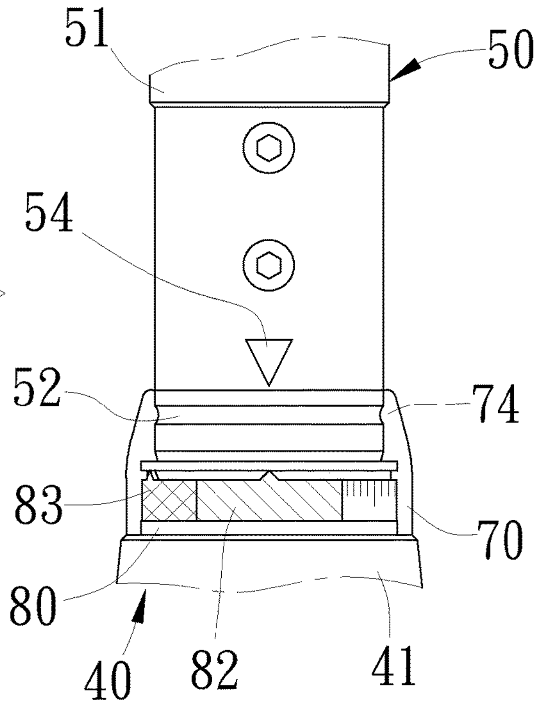

Referring to FIGS. 2, 3 and 7, the above-described process is repeated to change the limit of torque that can be transferred by the handle 30. The pointer 54 is pointed at the colored area 82. It is easily observed that the limit of torque that can be transferred by the handle 30 is 18±5 Nm.

Referring to FIGS. 8 through 11, the bit 11 can be in various sizes. The bit 11 includes a U-shaped head 12 formed with two stationary jaws 13 separated from each other by a distance 15. Each of the stationary jaws 13 is formed with a contact face 14 so that the contact faces 14 of the stationary jaws 13 extend parallel to each other. The head 12 includes a raised portion 16 formed on an upper face and an insert 17 extending backward from the raised portion 16. The insert 17 is formed with a recess (FIG. 16) in a lower face to receive a spring 18 and a ball 19. The spring 18 is compressed between a closed end of the recess of the insert 17 and a first portion of the ball 19 so that a second portion of the ball 19 extends from the insert 17 via an open end of the recess of the insert 17. The first portion of the ball 19 is kept in the recess of the insert 17.

Figure 15:
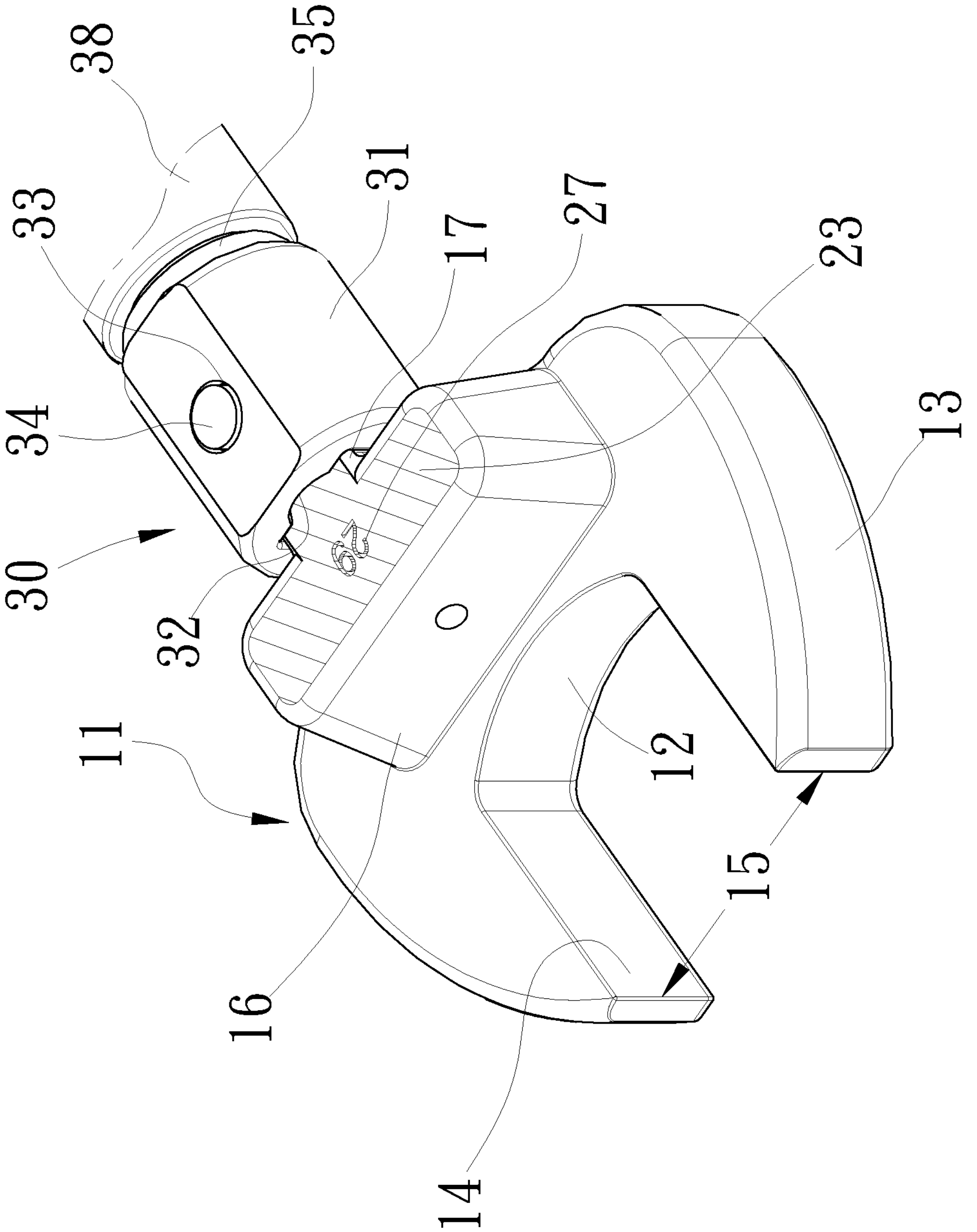
FIG. 15 is an enlarged perspective view of a torque tool including the handle shown in FIG. 1 and the first bit shown in FIG. 8.
Figure 16:
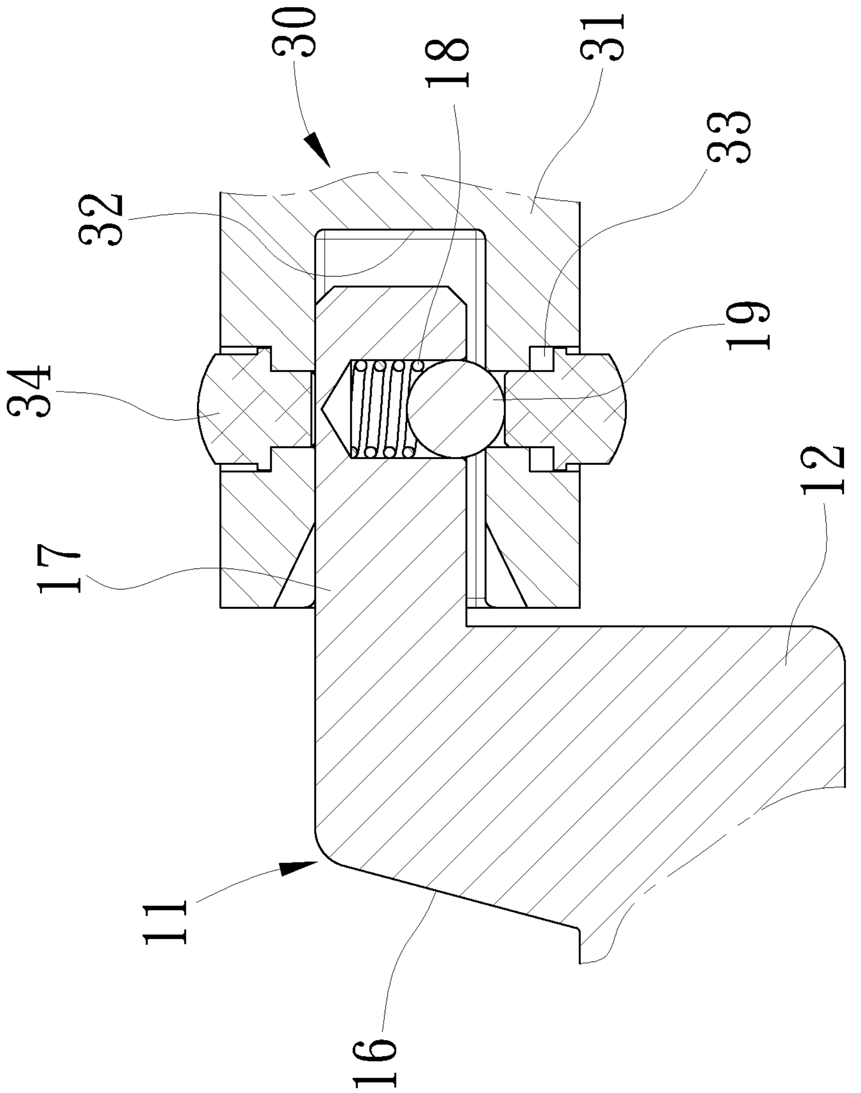
FIG. 16 is an enlarged, partial and cross-sectional view of the torque tool shown in FIG. 15.

Referring to FIGS. 15 and 16, the insert 17 is inserted in the bore 32. The second portion of the ball 19 pushes a first portion of a selected one of the buttons 34 into a selected one of the apertures 33 so that the second portion of the ball 19 enters the selected aperture 33 to keep the insert 17 in the bore 32. Now, a second portion of the selected button 34 sticks out of the selected aperture 33.

When the second portion of the selected button 34 is pushed in the selected aperture 33, the first portion of the button 34 pushes the second portion of the ball 19 out of the selected aperture 33 to allow movement of the insert 17 from the bore 32. Then, the bit 11 can be replaced with another bit.

The bit 11 including the stationary jaws 13 is in the form of a head of an open-ended wrench. Thus, the combination of the bit 11 with handle 30 becomes an open-ended wrench 10.

In operation, the contact faces 14 of the stationary jaws 13 are expected to contact two opposite facets of a workpiece such as a nut or a head or a threaded bolt. The workpiece cannot be located between the stationary jaws 13 if the distance between the opposite facets of the workpiece is larger than the distance between the contact faces 14 of the stationary jaws 13. The opposite facets of the workpiece cannot be in proper contact with the contact faces 14 of the stationary jaws 13 if the distance between the opposite facets of the workpiece is excessively smaller than the distance between the contact faces 14 of the stationary jaws 13. That is, the bit 11 is only useful for rotating a workpiece in a size.

Figure 4:
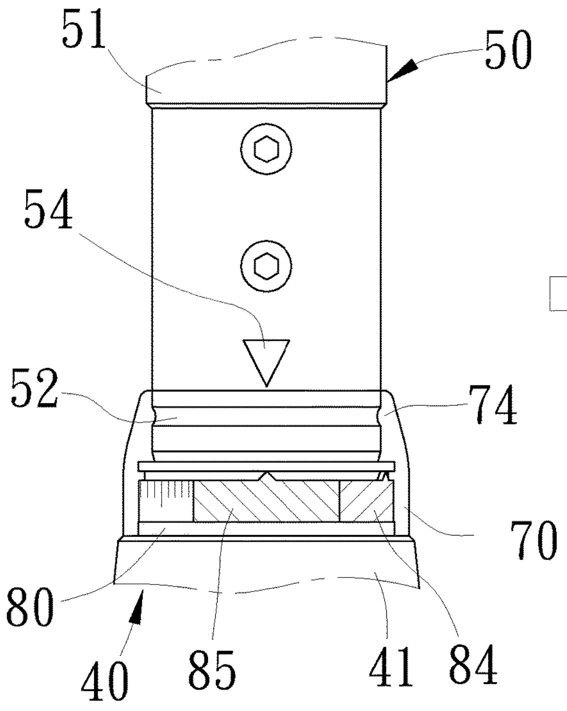
FIGS. 4 through 7 are enlarged top views of an indicating unit of the handle shown in FIG. 1.

Referring to FIGS. 4 and 15, the identification symbol 27 is located in the colored layer 23. The color of the colored layer 23 is identical or similar to the color of the colored area 85. Hence, it is obvious that the color ring 80 should be rotated to align the colored area 85 of the color ring 80 with the pointer 54 so that the limit of torque that can be transferred by the handle 30 is set to be 65±5 Nm when the bit 11 of 29 mm is used.

Figure 8:
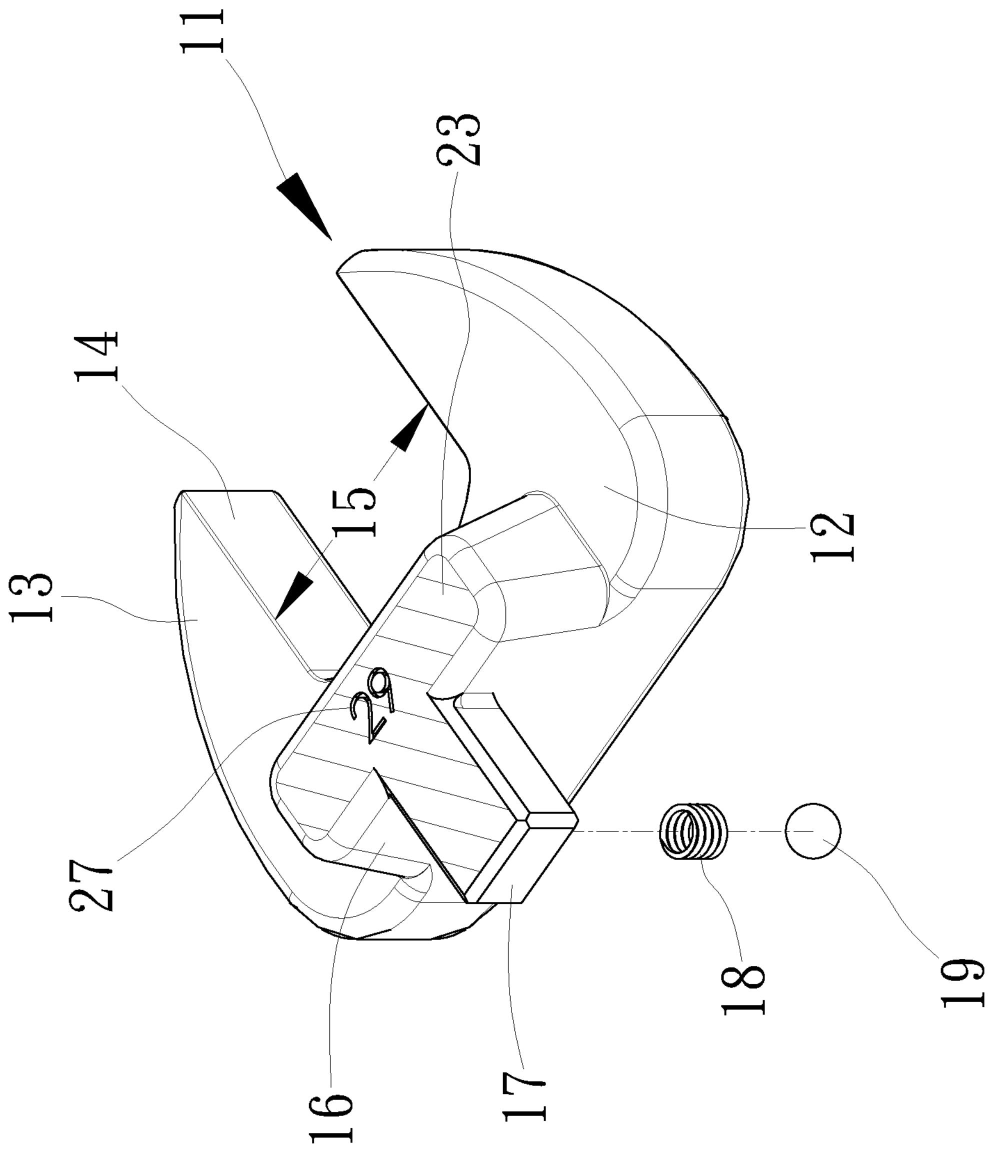
FIG. 8 is an enlarged, partial and perspective view of a first bit for use with the handle shown in FIG. 1.

Referring to FIGS. 4 and 8, a colored layer 23 covers an upper face of the raised portion 16 of the bit 11 and an upper face of the insert 17. An identification symbol 27 is supported on the upper face of the raised portion 16 of the bit 11. The symbol 27 shows "29."

Figure 9:
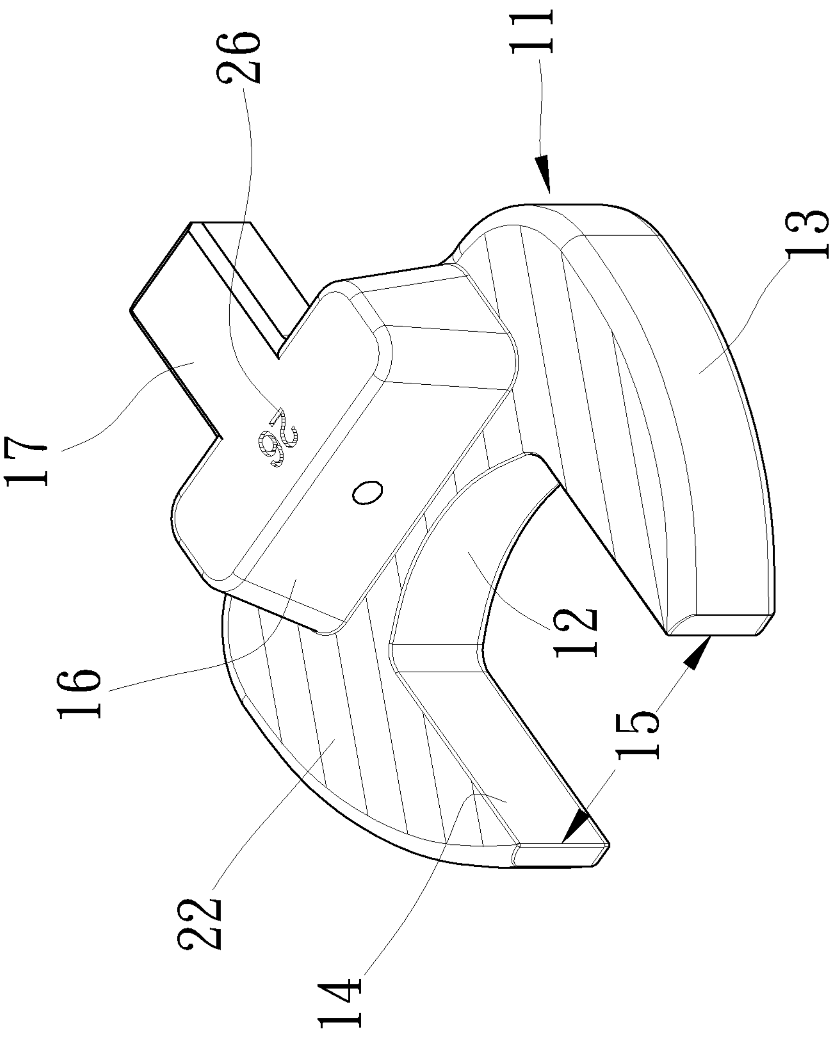
FIG. 9 is an enlarged, partial and perspective view of a second bit for use with the handle shown in FIG. 1.

Referring to FIGS. 5 and 9, the bit 11 is in a second size. The bit 11 in the second size is like the bit 11 in the first size except for two more things. Firstly, a colored layer 22 is supported on the head 12 instead of the colored layer 23 supported on the raised portion 16 of the bit 11. Secondly, an identification symbol 26 is supported on the raised portion 16 of the bit 11 instead of the identification symbol 27. The symbol 26 shows "26." The color of the colored layer 22 is identical or similar to the color of the colored area 84. Hence, it is obvious that the color ring 80 should be rotated to align the colored area 84 of the color ring 80 with the pointer 54 so that the limit of torque that can be transferred by the handle 30 is set to be 55±5 Nm when the bit 11 of 26 mm is used.

Figure 10:
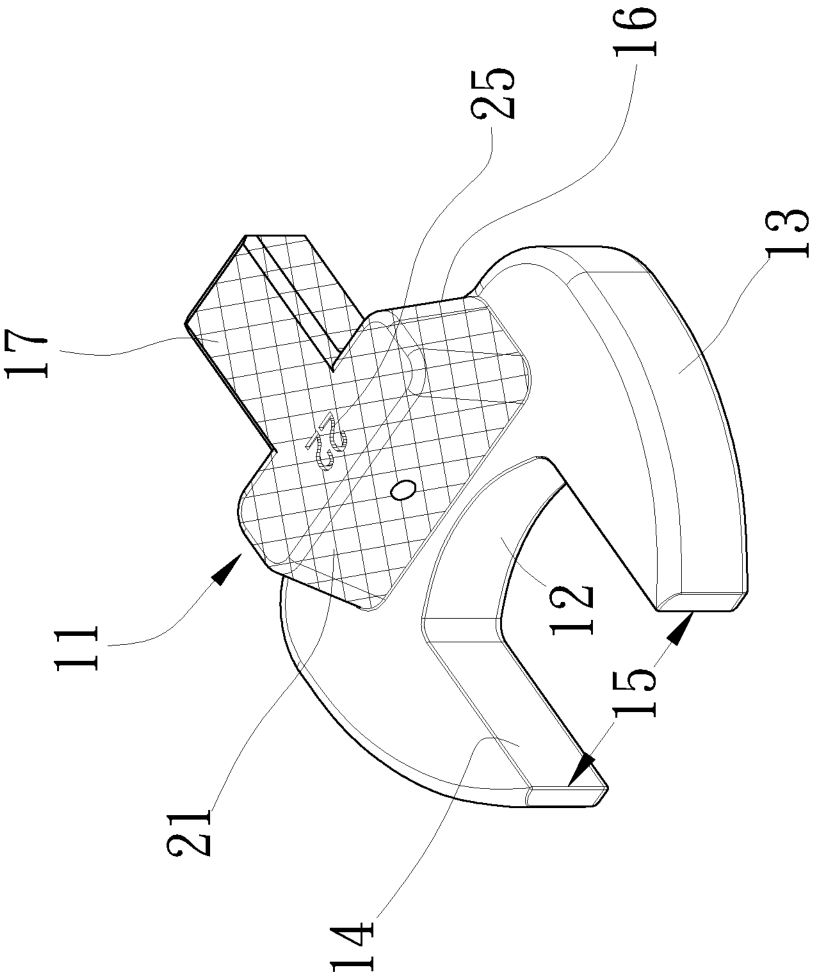
FIG. 10 is an enlarged, partial and perspective view of a third bit for use with the handle shown in FIG. 1.

Referring to FIGS. 6 and 10, the bit 11 is in a third size. The bit 11 in the third size is like the bit 11 in the first size except for two more things. Firstly, a colored layer 21 is supported on the raised portion 16 of the bit 11. Secondly, an identification symbol 25 is supported on the raised portion 16 of the bit 11 instead of the identification symbol 27. The symbol 25 shows "22." The color of the colored layer 21 is identical or similar to the color of the colored area 83. Hence, it is obvious that the color ring 80 should be rotated to align the colored area 83 of the color ring 80 with the pointer 54 so that the limit of torque that can be transferred by the handle 30 is set to be 42±5 Nm when the bit 11 of 22 mm is used.

Figure 11:
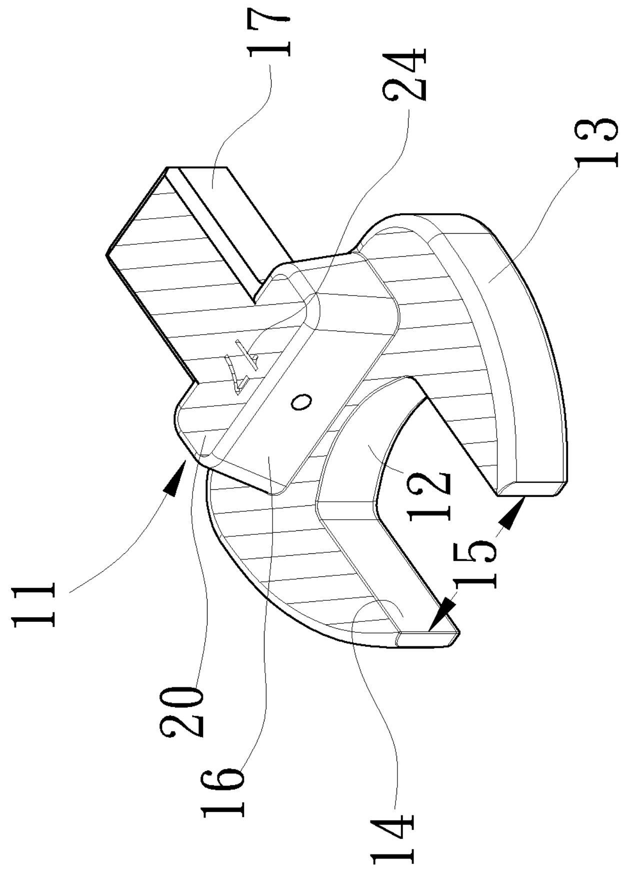
FIG. 11 is an enlarged, partial and perspective view of a fourth bit for use with the handle shown in FIG. 1.

Referring to FIGS. 7 and 11, the bit 11 is in a fourth size. The bit 11 in the fourth size is like the bit 11 in the first size except for two more things. Firstly, a colored layer 20 is supported on the head 12 and the raised portion 16 of the bit 11 instead of the colored layer 23 supported on the raised portion 16 of the bit 11. Secondly, an identification symbol 24 is supported on the raised portion 16 of the bit 11 instead of the identification symbol 27. The symbol 24 shows "17." The color of the colored layer 20 is identical or similar to the color of the colored area 82. Hence, it is obvious that the color ring 80 should be rotated to align the colored area 82 of the color ring 80 with the pointer 54 so that the limit of torque that can be transferred by the handle 30 is set to be 18±5 Nm when the bit 11 of 17 mm is used.

A color coding is shown in a table as follows:

| Color | Size | Limit of Torque (Nm) |
|---|---|---|
| colored layer 20 and colored area 82 | 17 | 18 |
| colored layer 21 and colored area 83 | 22 | 42 |
| colored layer 22 and colored area 84 | 26 | 55 |
| colored layer 23 and colored area 85 | 29 | 65 |

As discussed above, the bit 11 can be in various sizes indicated by different colored layers and symbols corresponding to different values of the distance between the contact faces 14 of the stationary jaws 13. Thus, they are operable to exert different limits of torque on workpieces in different sizes.

Figure 12:
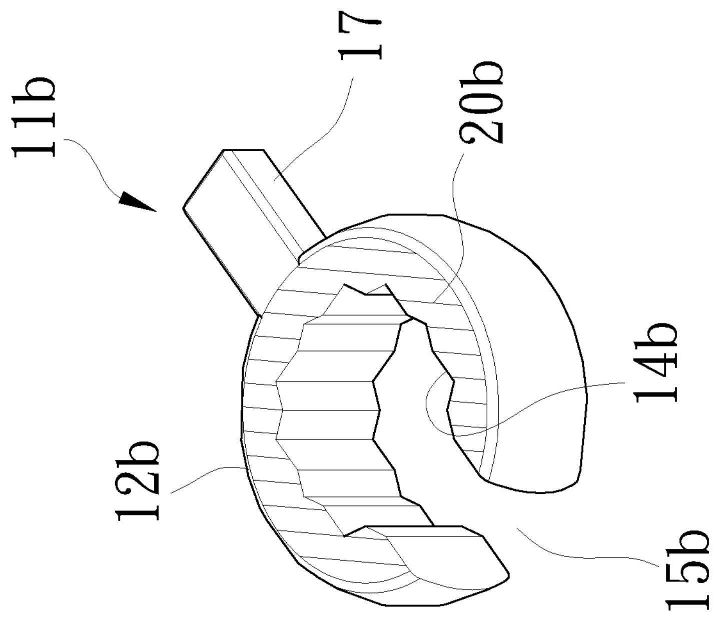
FIG. 12 is an enlarged, partial and exploded view of a fifth bit for use with the handle shown in FIG. 1.

Referring to FIG. 12, there is a bit **11*b* for use with the handle 30. The bit 11*b* is like the bit 11 except for including a C-shaped head 12*b* instead of the U-shaped head 12. The head 12*b* includes two arched jaws (not numbered) each of which includes a free end so that the free ends of the jaws of the head 12*b* are separated from each other by a distance 15*b*. The head 12*b* includes contact facets 14*b* arranged like a star instead of the contact faces 14. For example, a colored layer 20*b* is supported on an upper face of the head 12*b*. According to the color coding, the limit of torque that can be transferred by the handle 30 is 18±5 Nm when the handle 30 is used with the bit 11*b***.

Figure 13:
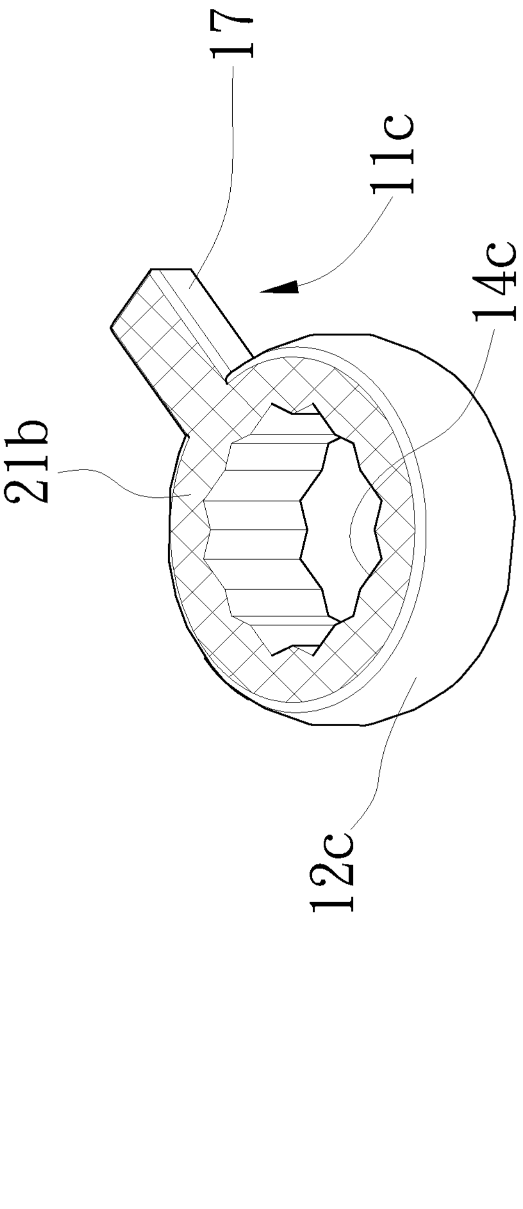
FIG. 13 is an enlarged, partial and exploded view of a sixth bit for use with the handle shown in FIG. 1.

Referring to FIG. 13, there is a bit **11*c* for use with the handle 30. The bit 11*c* is like the bit 11*b* except for including an annular head 12*c* instead of the C-shaped head 12*b*. The head 12*b* includes contact facets 14*c* arranged like a star. For example, a colored layer 21*b* is supported on an upper face of the head 12*c*. According to the color coding, the limit of torque that can be transferred by the handle 30 is 42±5 Nm when the handle 30 is used with the bit 11*c***.

Figure 14:
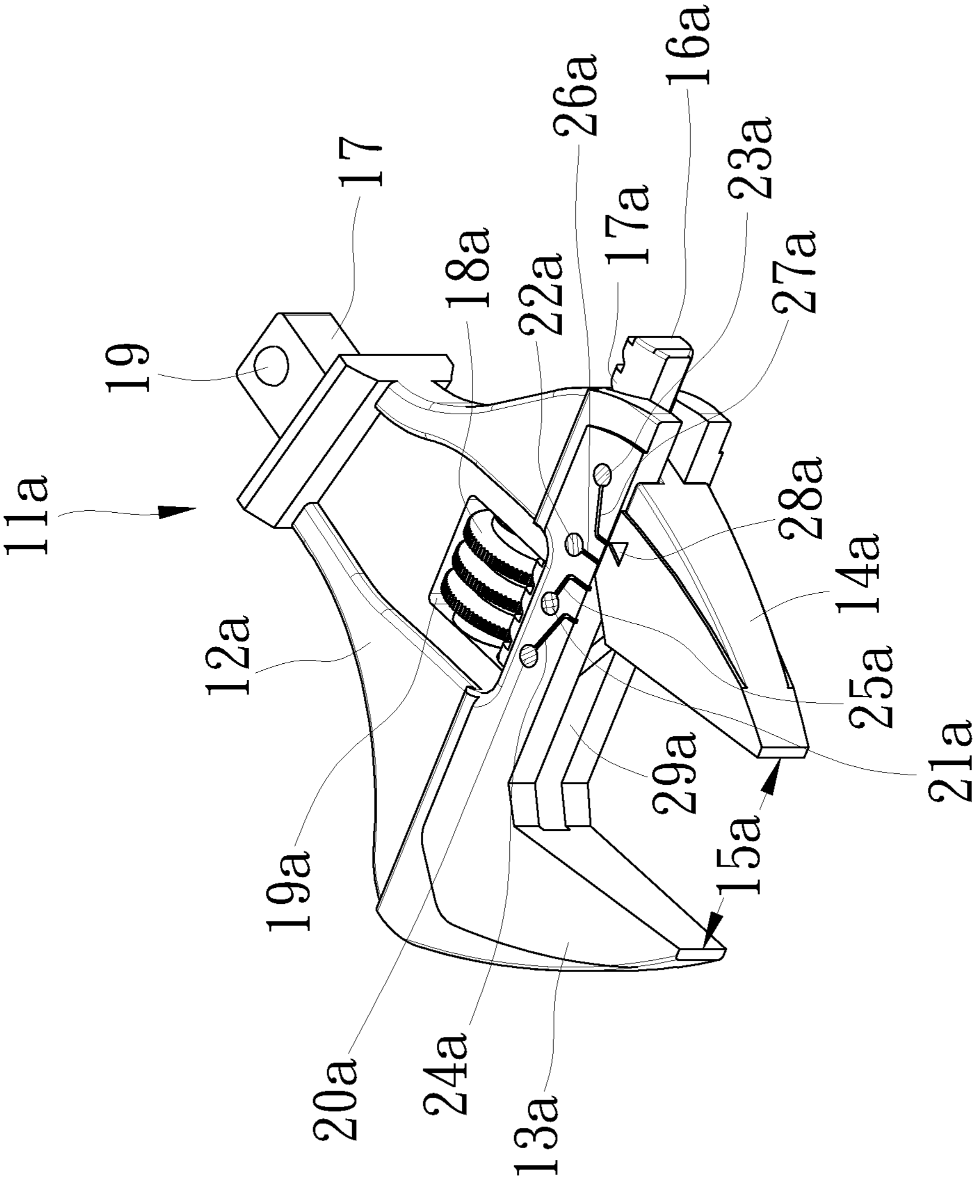
FIG. 14 is an enlarged, partial and perspective view of a seventh bit for use with the handle shown in FIG. 1.

Referring to FIG. 14, there is a bit **11*a* for use with the handle 30. The bit 11*a* is in the form of a head of an adjustable wrench including a head 12*a*, a stationary jaw 13*a* formed in one piece with the head 12*a*, and a movable jaw 14*a* movably connected to the head 12*a*. Thus, there is an adjustable distance 15*a* between the stationary jaw 13*a* and the movable jaw 14*a*. The head 12*a* includes a groove 29*a* in communication with an opening 19*a*. The movable jaw 14*a* is formed with a rack 16*a* including teeth 17*a*. The rack 16*a* is movably inserted in the groove 29*a*. A worm 18*a* is rotationally inserted in the opening 19***a*. The worm 18*a* is engaged with the rack 16*a* so that the worm 18*a* is rotated to move the rack 16*a* in the groove 29*a*. Accordingly, the movable jaw 14*a* is moved relative to the stationary jaw 13*a*.

The bit 11*a* includes colored layers 20*a*, 21*a*, 22*a* and 23*a* respectively connected to identification symbols 24*a*, 25*a*, 26*a* and 27*a*. The movable jaw 14*a* is provided with a pointer 28*a* in the form of a triangle or arrow head for alignment with one identification symbols 24*a*, 25*a*, 26*a* and 27*a*. The colored layer 20*a* and the identification symbol 24*a* are in a same color. The colored layer 21*a* and the identification symbol 25*a* are in a same color. The colored layer 22*a* and the identification symbol 26*a* are in a same color. The colored layer 23*a* and the identification symbol 27*a* are in a same color. The colored layers 20*a*, 21*a*, 22*a* and 23*a* are in different colors corresponding to the colored layers 82, 83, 84 and 85.

Figure 17:
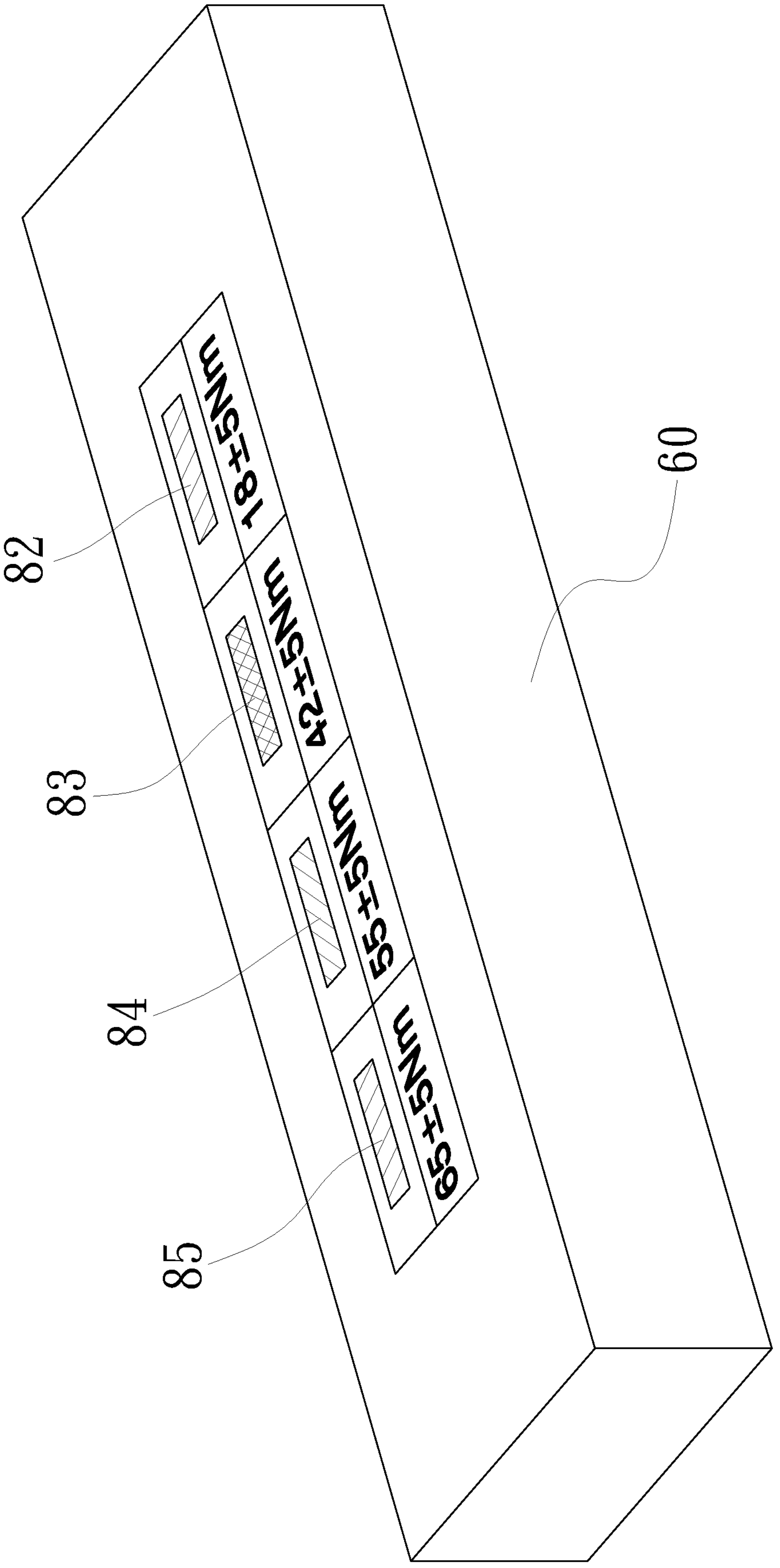
FIG. 17 is a perspective view of a box for packing the handle shown in FIG. 1.
Figure 18:
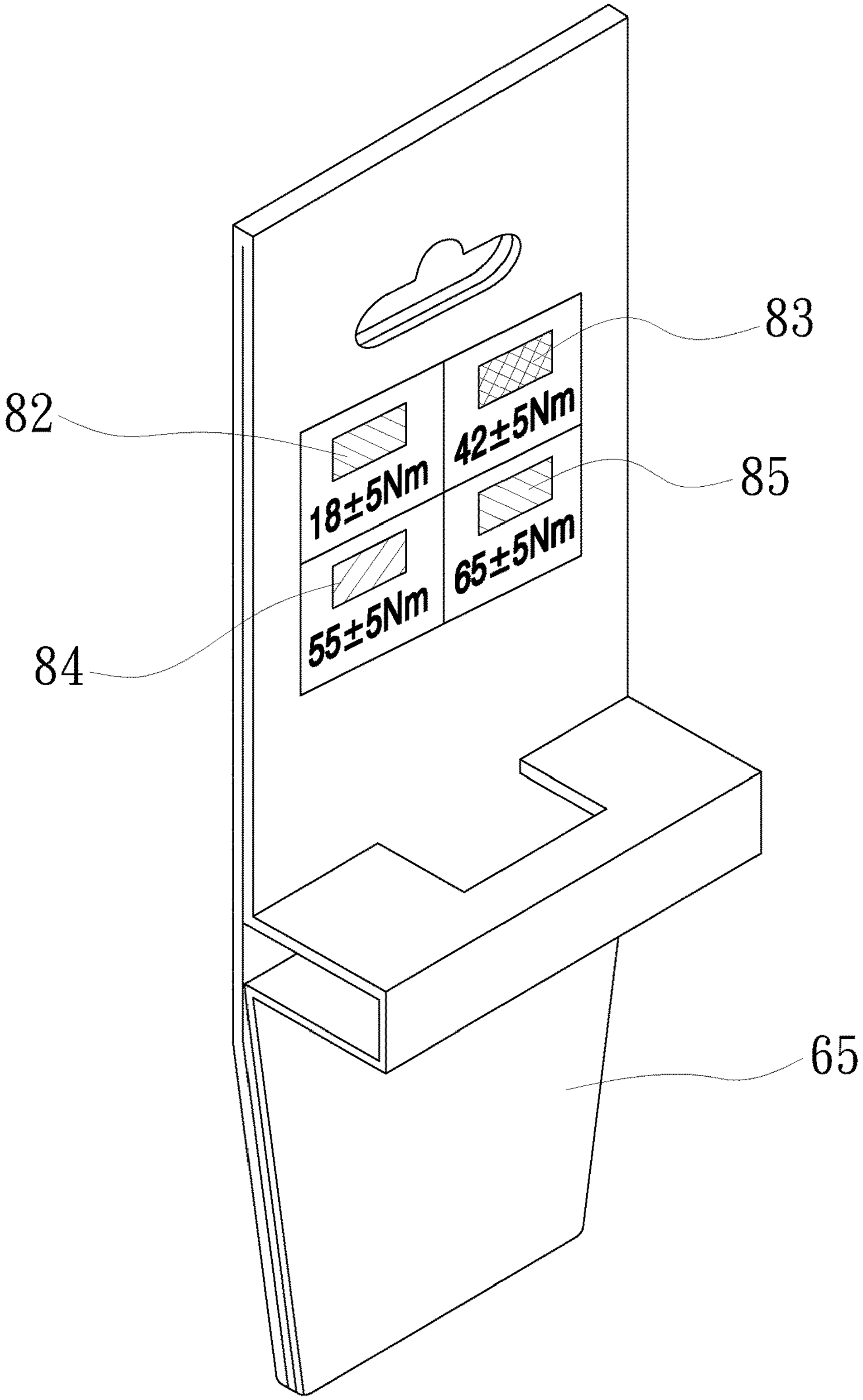
FIG. 18 is a perspective view of a tag/hanger for the handle shown in FIG. 1.

The above-mentioned table shows the relation of each of the colored areas 82, 83, 84 and 85 to a corresponding one of the limits of torque. The above-mentioned table or a similar table can be shown on a reference material such as a packing material 60 (FIG. 17), a user's manual, a sticker, a tag/hanger 65 (FIG. 18), a web site or application software. The packing material 60 can be a box, a bag or piece of paper. The user does not have to strive to memorize the relation. Instead, the user will memorize the relation by and by. The user can cast away the reference material after memorizing the relation.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A torque tool comprising:

a handle operable to set limits of torque;

a pointer formed on the handle; and a color ring comprising colored areas corresponding to the limits of torque, wherein the color ring is rotatable around the handle to align one of the colored areas with the pointer to indicate that the handle is ready to transfer torque no larger than a corresponding one of the limits of torque.

2. The torque tool according to claim 1, further comprising a lens for covering the color ring.

3. A torque tool assembly comprising a handle operable to set limits of torque;

a pointer formed on the handle;

a color ring comprising colored areas corresponding to the limits of torque and being rotatable around the handle to align one of the colored areas with the pointer to indicate that the handle is ready to transfer torque no larger than a corresponding one of the limits of torque; and a reference material for showing the relation of each of the colored areas to a corresponding one of the limits of torque.

4. The torque tool assembly according to claim 3, wherein the reference material is one selected from the combination of a packing material, a user's manual, a sticker, a tag, a web site or application software.

* * * * *